(12) United States Patent
Bouchard et al.

(10) Patent No.: US 7,418,333 B2
(45) Date of Patent: Aug. 26, 2008

(54) METHOD OF ADJUSTING A MOTOR VEHICLE ELECTRONIC STABILITY PROGRAM

(75) Inventors: Christophe Bouchard, Argenteuil (FR); Richard Sautereau, Paris (FR)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 11/746,840

(22) Filed: May 10, 2007

(65) Prior Publication Data

US 2007/0265737 A1 Nov. 15, 2007

(30) Foreign Application Priority Data

May 10, 2006 (FR) .................................. 06 04316

(51) Int. Cl.
G06F 7/70 (2006.01)
G06G 7/76 (2006.01)
(52) U.S. Cl. .............................. 701/70; 701/38; 303/20; 303/121; 188/137; 73/121
(58) Field of Classification Search .............. 701/70, 701/38; 303/121, 20; 188/137; 73/121
See application file for complete search history.

(56) References Cited

U.S. PATENT DOCUMENTS

| | | | | |
|---|---|---|---|---|
| 5,341,297 | A * | 8/1994 | Zomotor et al. | 701/72 |
| 5,386,365 | A * | 1/1995 | Nagaoka | 701/44 |
| 5,842,143 | A * | 11/1998 | Lohrenz et al. | 701/34 |
| 5,973,463 | A * | 10/1999 | Okuda et al. | 318/430 |
| 6,223,107 | B1 * | 4/2001 | Mergenthaler et al. | 701/34 |
| 6,427,130 | B1 * | 7/2002 | Mergenthaler et al. | 702/142 |
| 6,502,014 | B1 * | 12/2002 | Herrmann et al. | 701/1 |
| 6,988,395 | B1 * | 1/2006 | Bleckmann et al. | 73/118.1 |
| 7,096,103 | B2 * | 8/2006 | Salib et al. | 701/38 |
| 7,120,528 | B2 * | 10/2006 | Salib et al. | 701/45 |

FOREIGN PATENT DOCUMENTS

| | | | |
|---|---|---|---|
| EP | PCT/DE98/01299 | * | 1/1999 |
| WO | WO99/01321 | * | 1/1999 |
| WO | PCT/EP99/04324 | * | 12/1999 |
| WO | WO99/67115 | * | 12/1999 |

(Continued)

OTHER PUBLICATIONS

2nd Joint IEEE International Workshop on Visual Surveillance and Performance Evaluation of Tracking and Surveillance (VS-PETS); Research in Microelectronics and Electronics, 2005 PhD, vol. 1, Jul. 25-28, 2005 pp. 241-611; Digital Object Identifier 10.1109/RME.2005.1543049.*

(Continued)

Primary Examiner—Cuong H. Nguyen
(74) Attorney, Agent, or Firm—Michael Best & Friedrich LLP

(57) ABSTRACT

The invention relates to a method of adjusting an electronic stability program (ESP) for a motor vehicle. This method comprises various steps, including in particular: establishing the curve of the consumption values (Cesp) as a function of time, said curve being representative of the differences (dCM) of the measured yaw angles and the setpoint yaw angles (dCM=LM−LC) versus the measured triggering threshold values (St), modifying the nominal threshold values (Sv) by a percentage that is proportional to the consumption values (Cesp).

2 Claims, 3 Drawing Sheets

FOREIGN PATENT DOCUMENTS

WO    02/058976 A1    8/2002

OTHER PUBLICATIONS

Wheel forces during flange climb. I. Track loading vehicle tests; Shust, W.C.; Elkins, J.A.; Railroad Conference, 1997, Proceedings of the 1997 IEEE/ASME Joint☐☐Mar. 18-20, 1997 pp. 137-147; Digital Object Identifier 0.1109/RRCON.1997.581394.*

A virtual motorcycle driver for closed-loop simulation; Frezza, R.; Beghi, A.; Control Systems Magazine, IEEE; vol. 26, Issue 5, Oct. 2006 pp. 62-77.*

Robust QFT tracking controller design for a Car equipped with 4-Wheel Steer-by-Wire; Barreras, M.; Villegas, C.; Garcia-Sanz, M.; Kalkkuhl, J.; Control Applications, 2006. CCA '06. IEEE International Conference on; Oct. 2006 pp. 1312-1317; Digital Object Identifier 10.1109/CCA.2006.286028.*

Contribution to the integrated control synthesis of road vehicles; Rodic, A.D.; Vukobratovic, M.K.; Control Systems Technology, IEEE Transactions on; vol. 7, Issue 1, Jan. 1999 pp. 64-78; Digital Object Identifier 10.1109/87.736754.*

Fuzzy-logic-based control applied to a hybrid electric vehicle with four separate wheel drives; Pusca, R.; Ait-Amirat, Y.; Berthon, A.; Kauffmann, J.-M.; Control Theory and Applications, IEE Proceedings—vol. 151, Issue 1, Jan. 17, 2004 pp. 73-81 Digital Object Identifier 10.1049/ip-cta:20040066.*

Robust vehicle yaw control using active differential and internal model control techniques; Canale, M.; Fagiano, L.; Milanese, M.; Borodani, P.; American Control Conference, 2006; Jun. 14-16, 2006 p. 6 pp.; Digital Object Identifier .1109/ACC.2006.1657574.*

Nonlinear tire lateral force versus slip angle curve identification; Shiang-Lung Koo; Han-Shue Tan; Tomizuka, M.; American Control Conference, 2004. Proceedings of the 2004; vol. 3, Jun. 30-Jul. 2, 2004 pp. 2128-2133 vol. 3.*

Development of automatic driving system on rough road-automatic steering control fuzzy algorithm; Shigematu, T.; Hashimoto, Y.; Watanabe, T.; Intelligent Vehicles '92 Symposium., Proceedings of the; Jun. 29-Jul. 1, 1992 pp. 154-159 Digital Object Identifier 10.1109/IVS.1992.252249.*

Control of a car-like robot using a virtual vehicle approach; Egerstedt, M.; Hu, X.; Stotsky, A.; Decision and Control, 1998. Proceedings of the 37th IEEE Conference on; vol. 2, Dec. 16-18, 1998 pp. 1502-1507 vol. 2; Digital Object Identifier 10.1109/CDC.1998.758501.*

Robust QFT tracking controller design for a Car equipped with 4-Wheel Steer-by-Wire; Barreras, M.; Villegas, C.; Garcia-Sanz, M.; Kalkkuhl, J.; Control Applications, 2006. CCA '06. IEEE International Conference on; Oct. 2006 pp. 1312-1317 Digital Object Identifier 10.1109/CCA.2006.286028.*

Parity space based FDI-scheme for vehicle lateral dynamics; Schneider, S.; Weinhold, N.; Ding, S.X.; Rehm, A.; Control Applications, 2005. CCA 2005. Proceedings of 2005 IEEE Conference on; Aug. 28-31, 2005 pp. 1409-1414 Digital Object Identifier 10.1109/CCA.2005.1507329.*

Control of a car-like robot using a dynamic model; Egerstedt, M.; Hu, X.; Stotsky, A.; Robotics and Automation, 1998. Proceedings. 1998 IEEE International Conference on; vol. 4, May 16-20, 1998 pp. 3273-3278 vol. 4; Digital Object Identifier 10.1109/Robot.1998.680943.*

Control design for flexible spacecraft using the integrated analysis capability; Bossi, J.; Price, G.; Winkleblack, S.; Control Systems Magazine, IEEE; vol. 5, Issue 4, Nov. 1985 pp. 9-15.*

Dynamic turning control of a quadruped robot using nonlinear oscillators; Tsujita, K.; Toui, H.; Tsuchiya, K.; Intelligent Robots and Systems, 2004. (IROS 2004). Proceedings. 2004 IEEE/RSJ International Conference on; vol. 1, Sep. 28-Oct. 2, 2004 pp. 969-974 vol. 1; Digital Object Identifier 10.1109/IROS.2004.1389478.*

* cited by examiner

METHOD OF ADJUSTING A MOTOR VEHICLE ELECTRONIC STABILITY PROGRAM

BACKGROUND OF THE INVENTION

The invention relates to a method of adjusting an electronic stability program for a motor vehicle.

SUMMARY OF THE INVENTION

An electronic stability program ESP is a system that makes it possible to avoid and/or correct the instabilities of a vehicle. This system is strongly linked to the vehicle wheel control systems and in particular the braking system. The ESP system is a global system that manages the overall behavior of the vehicle and that assists the driver even in critical situations. It is able to intervene on the antilock braking system (ABS) and on the antiskid regulation system ASR.

Thus, it can be used to provide assistance to the driver or to complement his control in various situations such as: turning the wheels in extreme conditions, directional stability of the vehicle in limiting ranges of use, and the use of tire grip conditions on the ground.

To be able to affect the behavior of the vehicle and to be able to generate controls enabling the vehicle to follow the path required by the driver, the electronic stability program needs to receive a large quantity of information concerning the behavior of the vehicle and that of the various wheels to be able to correlate these various behaviors and provide the corrections needed to assist the antilock braking system, the antiskid regulation system and the engine torque control system.

One way of acting on the behavior of the vehicle is to apply a brake to one or more of the wheels.

However, the ESP system should intervene only in cases of absolute necessity when the driver cannot rectify the situation of the vehicle without acting on the brakes. It is therefore necessary for the ESP intervention threshold to be defined appropriately and for a standard type of driver.

It can be seen that the control margin for an ESP system with respect to unwanted triggering is difficult to know. Moreover, debugging an ESP system involves numerous rolling tests to confirm the ESP system triggering thresholds.

The invention provides a method with which to resolve these difficulties.

According to one preferred embodiment of the invention, this method comprises the following steps:

Step a: equipping a vehicle with an ESP system having nominal operating threshold values (Sv) for the electronic stability program ESP for different speeds, Step b: acquiring in real time, on said vehicle in a rolling situation, at various moments, setpoint yaw angles, Step c: acquiring in real time, in a rolling situation, at the same moments, the yaw angles measured on the vehicle, Step d: measuring the ESP triggering threshold (St) at these various moments, Step e: establishing the curve of the consumption values as a function of time, said curve being representative of the differences of the measured yaw angles and the setpoint yaw angles versus the measured triggering threshold values, Step f: modifying the nominal threshold values by a percentage that is proportional to the consumption values.

According to the invention, it is possible to provide for this method to be a method of selecting the tire characteristics of a vehicle.

According to the invention, this method is also advantageously a method of adjusting the suspension of a vehicle.

There is also provision for this method to be a method of dynamically adjusting and debugging the electronic stability program (ESP) of a vehicle.

BRIEF DESCRIPTION OF THE DRAWINGS

The various objects and characteristics of the invention will become more clearly apparent from the description and the appended figures which represent.

DETAILED DESCRIPTION

Figure 1:
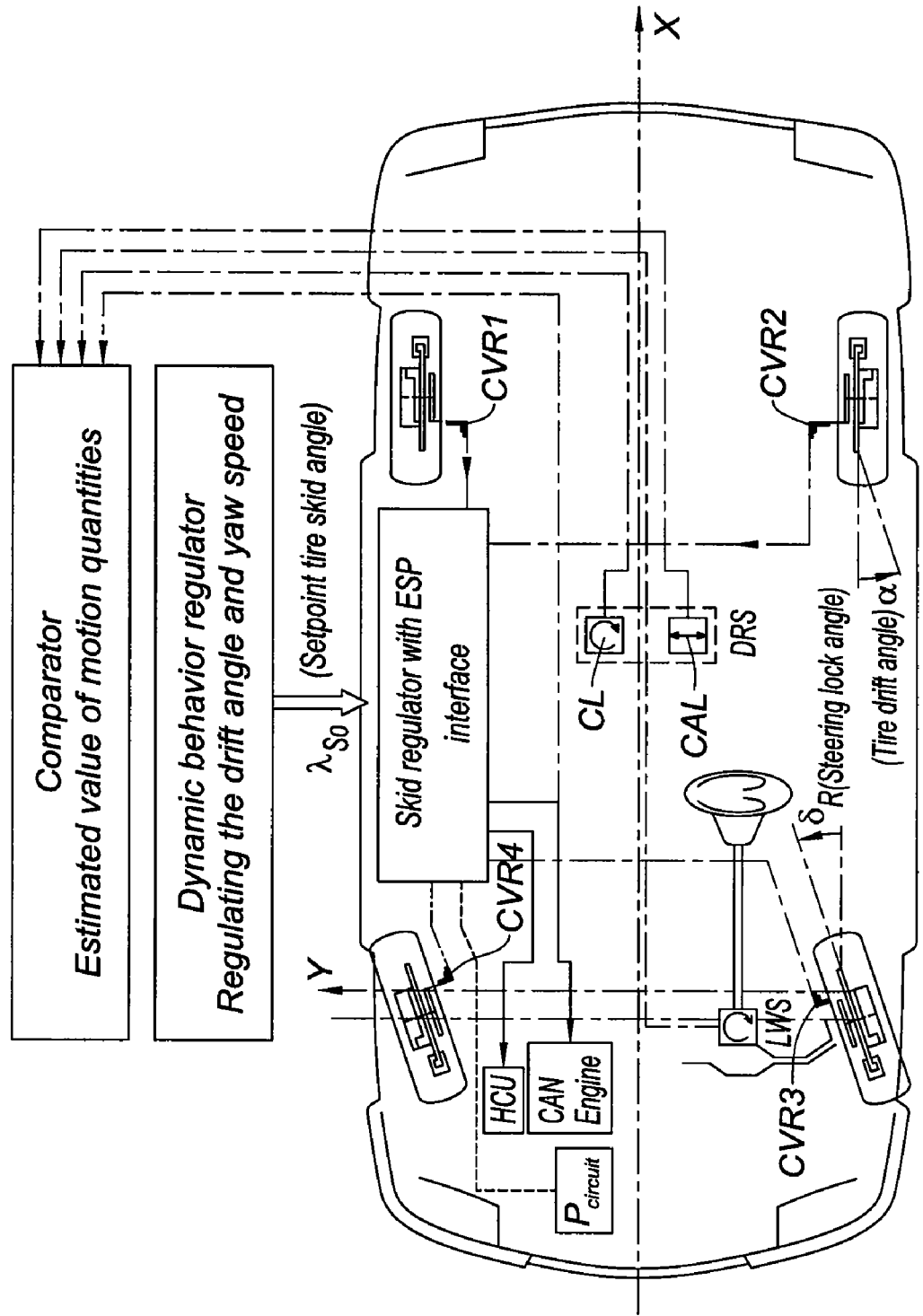
FIG. 1 A vehicle equipped with an electronic stability program.

FIG. 1 diagrammatically represents a vehicle equipped with various sensors to provide information on the behavior of the vehicle.

There are thus: wheel speed sensors (CVR1 to CVR4), a lateral acceleration sensor CAL, a yaw sensor CL, a steering shaft rotation sensor LWS, and so on.

The various quantities measured by these sensors are transmitted to a comparator which calculates the various forces that are exerted on the vehicle.

An electronic stability program performs processes in order to generate instructions that are transmitted to the various units of the vehicle, mainly including the engine control computer CAN or the hydraulic control unit (HCU).

Figure 2:
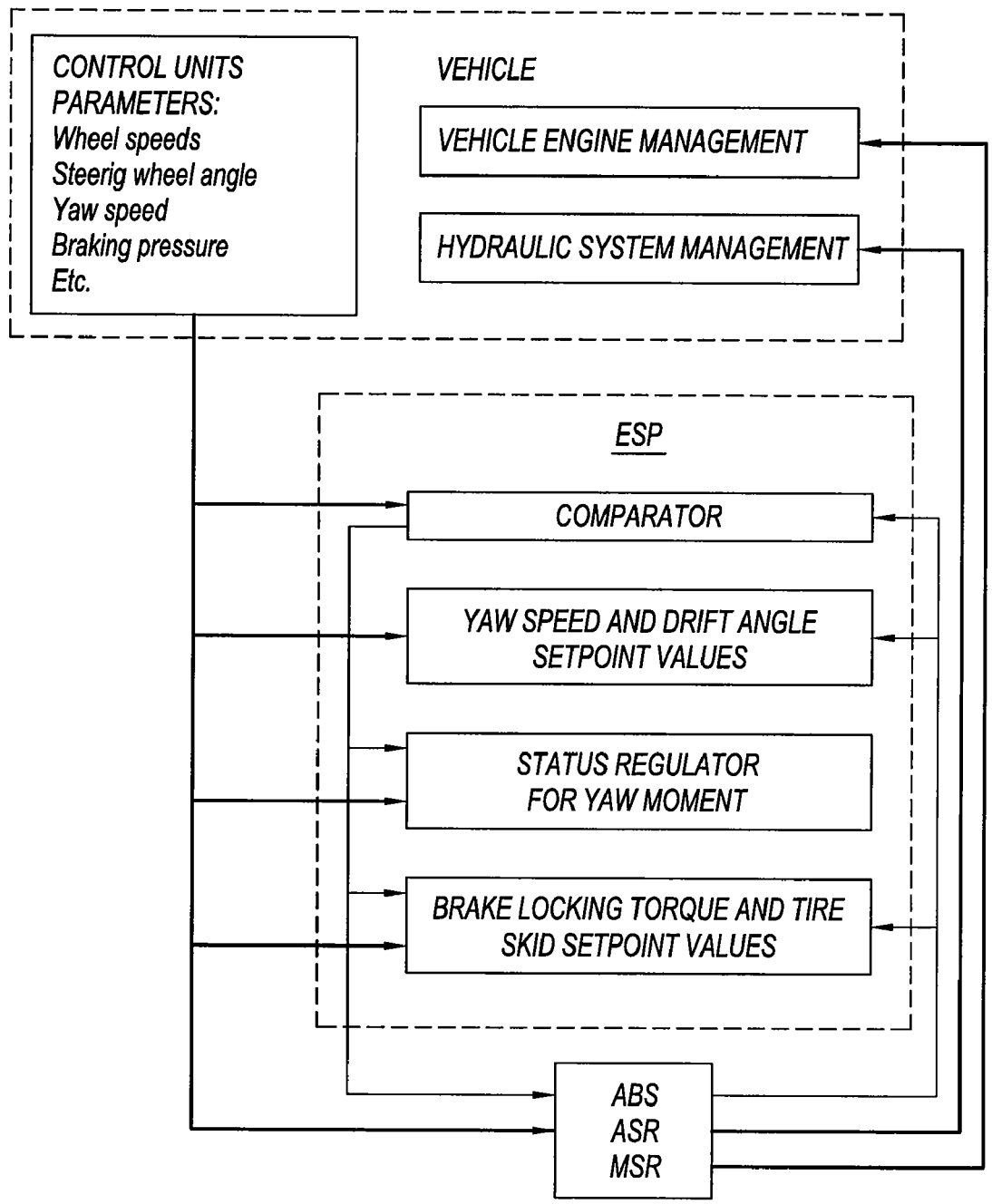
FIG. 2 A flow diagram of an electronic stability program to which the inventive method is applied.

FIG. 2 represents an electronic stability program ESP.

The top part contains a block symbolically representing a vehicle with: its vehicle engine management system generating engine controls, its management system for the hydraulic system and, in particular, for the braking system, the various controlled units linked to the rotation and braking of the wheels of the vehicle.

These various units have associated with them measuring instruments supplying various quantities that will be used as parameters in the processes performed by the ESP system. This block therefore contains all the possible information representing the instructions given to the vehicle and its behavior detected by different sensors. These are, for example, the following parameters: steering wheel angle, yaw speed (which is the speed of rotation of the vehicle about its vertical axis).

The bottom of FIG. 2 contains the antilock braking system ABS, anti-slip regulation system ASR and motor speed regulator system MSR. These systems receive the parameters concerning the behavior of the vehicle and of the wheels (rotation speed) and provide appropriate controls to the vehicle engine management system and to the hydraulic system management system.

The middle part of the figure contains the electronic stability program ESP. This ESP system comprises: a comparator that receives the various quantities recorded by the vehicle sensors and that calculates at each moment the various forces exerted on the vehicle, a circuit for calculating the setpoint yaw speed yaw value and the drift angle value according to the instructions supplied by the driver (acceleration, steering wheel lock angle, etc.), a regulator circuit that calculates the acceptable yaw moment based on the quantities supplied by the comparator and the calculated setpoint values, finally, a circuit that calculates the brake locking torque and tire skid setpoint values and that supplies appropriate instructions to the antilock braking system, the anti-slip regulation system and the motor speed regulator system.

In observing the behavior of the vehicle, one key element is the quantity supplied at each moment by the yaw sensor.

When the yaw sensor supplies a yaw speed greater than a predetermined value (ESP threshold), the electronic stability program must intervene to rectify the path of the vehicle. One of the means available to the ESP is to brake one or more wheels of the vehicle as is known in the art.

However, the problem is how to give the system an operating threshold that does not give rise to untimely triggering of the ESP system. In particular, it is best to have a triggering threshold that does not provide a triggering of the regulation system in a situation where the vehicle is not yet in a critical situation, particularly regarding its yaw speed.

According to the invention, a method is provided that can be applied to a vehicle equipped with an electronic stability program ESP that has been set to nominal triggering threshold values determined for various speeds. These various nominal threshold values are known or are measurable.

According to the invention, the vehicle is submitted to rolling tests, preferably on normal roads, in normal conditions of use, and over a journey of a few tens of kilometers.

During this rolling test, the following are measured at each moment: setpoint yaw angles LC supplied by the steering wheel control, measured yaw angles LM measured on the vehicle using the yaw sensors, triggering threshold values St for the ESP system that is always set to nominal threshold values.

Based on these values, for each moment, the ratio of the difference of the setpoint yaw angles and the measured yaw angles (dCM=LM−LC) versus the threshold values is calculated:

$$Cesp=(LM-LC)/St$$

There is thus obtained a series of threshold consumption values Cesp. These consumptions are expressed as percentages. The triggering threshold values of the ESP system (nominal threshold values) are then modified in proportion to the ESP threshold consumption. If the consumption is high, the nominal threshold value is increased. If the consumption is low, the threshold value is reduced or is increased less than in the preceding case.

Figure 3:
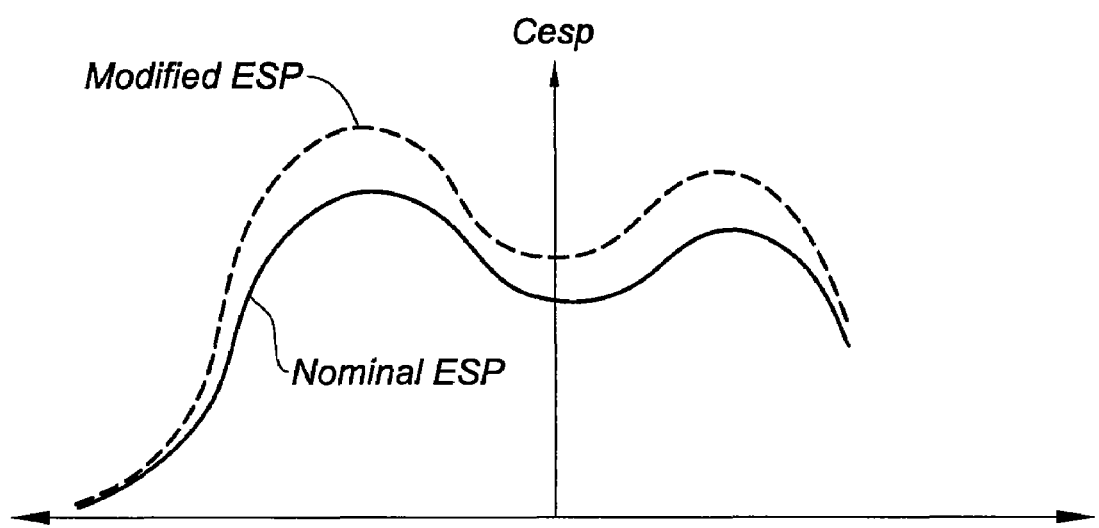
FIG. 3 Curves illustrating the inventive method.

For example, FIG. 3 shows an ESP threshold nominal consumption curve (as a continuous line in FIG. 3). After processing according to the inventive method and modifying the ESP triggering thresholds, an ESP consumption curve is obtained, represented as a broken line.

The present invention applies mainly to debugging the suspension of a motor vehicle (the tires of the vehicle, the suspension itself, the geometry of the suspension) and debugging the ESP system of the vehicle.

The invention claimed is:

1. Method of adjusting an electronic stability program for a motor vehicle, characterized in that it comprises the following steps:

step a: equipping a vehicle with an ESP system having nominal threshold values (Sv) for triggering the ESP system at different known speeds, step b: acquiring in real time, on said vehicle in a rolling situation, at various moments, setpoint yaw angles (LC), step c: acquiring in real time, in a rolling situation, at the same moments, the yaw angles measured on the vehicle (LM), step d: measuring the ESP triggering threshold (St) at these various moments, step e: establishing a curve of consumption values (Cesp) as a function of time, said curve being representative of the differences (dCM) of the measured yaw angles and the setpoint yaw angles (dCM=LM-LC) versus the measured triggering threshold values (St), step f: modifying the nominal threshold values (Sv) by a percentage that is proportional to the consumption values (Cesp).

2. Method according to claim 1, characterized in that said method is a method of dynamically adjusting and debugging the electronic stability program (ESP) of a vehicle.

* * * * *